United States Patent [19]

Cosman et al.

[11] Patent Number: 5,818,456

[45] Date of Patent: Oct. 6, 1998

[54] COMPUTER GRAPHICS SYSTEM WITH ADAPTIVE PIXEL MULTISAMPLER

[75] Inventors: Michael A. Cosman, South Jordan; Michael D. Drews, Sandy; Gary S. Watkins, Salt Lake City, all of Utah

[73] Assignee: Evans & Sutherland Computer Corporation, Salt Lake City, Utah

[21] Appl. No.: 641,184

[22] Filed: Apr. 30, 1996

[51] Int. Cl.[6] .................................................. G06T 11/40
[52] U.S. Cl. .......................... 345/434; 345/421; 345/428; 345/429
[58] Field of Search .................................... 345/136, 149, 345/191, 419, 421, 428–9, 431–4, 439; 382/269

[56] References Cited

U.S. PATENT DOCUMENTS

| | | | |
|---|---|---|---|
| 4,873,515 | 10/1989 | Dickerson et al. | 345/136 |
| 4,918,626 | 4/1990 | Watkins et al. | 345/421 |
| 5,185,852 | 2/1993 | Mayer | 395/109 |
| 5,347,620 | 9/1994 | Zimmer | 345/429 |
| 5,363,475 | 11/1994 | Baker et al. | 345/422 |
| 5,369,739 | 11/1994 | Akeley | 345/434 |
| 5,388,206 | 2/1995 | Poulton et al. | 345/505 |
| 5,394,515 | 2/1995 | Winser | 345/419 |
| 5,594,854 | 1/1997 | Baldwin et al. | 345/441 |

OTHER PUBLICATIONS

Choe, et al, "Single Pass Algorithm for the generation of Chain–coded Contours and Countours Inclusion Relationship", *Communications, Computers and Signal Processing, IEEE*, May 1993, pp. 256–259.

Blinn, James, "A trip Down the Graphics Pipeline: Subpixelic Particles", *IEEE Computer Graphics and Applications Magazine*, vol. 11, No. 5, pp. 86–90.

Abrash, Michael, "CGDC Quake Talk" *Taken from Game Developers Conference*, Apr. 2, 1996.

Foley, James D., et al, "Computer Graphics: Principles and Practices", *Addison–Wesley Publishing Co.*, 2nd ed. pp. 680–698. (1990).

Hearn, Donald, et al, "Computer Graphics", *Prentice Hall*, 1994, pp. 171–181.

*Primary Examiner*—Randolph J. Buchel, Jr.
*Attorney, Agent, or Firm*—Thorpe, North & Western, LLP

[57] ABSTRACT

An adaptive pixel multisampler generates pixel data for display using an interlocking sub-pixel sampling pattern and a frame buffer organized as a per-polygon, per-pixel heap. The interlocking sampling pattern provides the advantages of a multi-pixel shaped filter without pixel-to-pixel cross communication and without additional sub-pixels. The per-polygon, per-pixel heap allocates frame buffer memory so that each pixel will have one set of data stored in the frame buffer for every polygon that influences that pixel. This memory allocation scheme can significantly reduce frame buffer memory requirements. The polygon data is blended to properly handle processing of transparent polygons and polygon edges without the degradation of image quality found in conventional computer graphics systems.

20 Claims, 11 Drawing Sheets

COMPUTER GRAPHICS SYSTEM WITH ADAPTIVE PIXEL MULTISAMPLER

FIELD OF THE INVENTION

The present invention relates to computer graphics systems and more specifically to an adaptive pixel multisampler for processing image primitives to generate anti-aliased pixel data for display.

BACKGROUND AND SUMMARY OF THE INVENTION

In a typical computer graphics display application, a person views an image generated by the display system and displayed on a screen. Conventionally, the image is composed by an array of individual picture-cells ("pixels"). Pixels are the dots of color that define the image. Each of the pixels is defined by characteristics such as color and intensity. Traditionally, pixels are organized into a two-dimensional array or grid defined by raster lines. Each line is drawn by scan displaying the individual pixels along the line. An explanation of images composed of individual pixels is provided in a book *Computer Graphics: Principles and Practice,* 2nd Edition, Foley, van Dam, Feiner & Hughes, (Reprinted in 1991)(1990), by Addison-Wesley Publishing Company, see the section beginning on page 9.

In practice, rather than defining the characteristics of each pixel, display systems define an image from a collection of primitive graphic shapes such as polygons. The polygons are numerically represented in terms of size, color, location and other characteristics. To accomplish an image, the polygon representations are processed by an image generator producing pixel data signals by a process called polygon rendering. In effect, polygon rendering involves sampling a polygon to calculate how the polygon influences the pixels.

Display systems typically generate each pixel data signal by sampling several locations within the pixel of the polygon. This sampling technique is used to reduce undesirable visual artifacts in the displayed image. These visual artifacts, commonly referred to as aliasing, often appear as jagged lines at the polygon boundaries.

Conventionally, systems that use multiple sampling locations for each pixel treat pixels as square or rectangular regions in the image plane which are subdivided by a grid or array of sub-pixel points. Typically, the regions defined by the sub-pixel points abut their neighbors uniformly in both directions and cover the image plane exactly once. Each point is then considered with regard to each influencing scene detail (polygon) to generate a value for each sub-pixel point. Generally, the final color for a pixel is calculated by combining the sub-pixel values for that pixel. However, some display systems compute the final pixel color from a weighted average of the image information in a two-by-two set of pixels, that is, from four pixels worth of sub-pixel values.

The number of sub-pixels used to generate the final color for each pixel has a direct impact on the cost of the display system. Display systems typically store data for each sub-pixel in the pixel. Thus, pixel data memory (commonly referred to as "frame buffer" memory) must be allocated for every sub-pixel in every pixel. For example, a graphics system that uses 16 sub-pixels per pixel and has a display with a 1024-by-1024 array of pixels would use over 16 million frame buffer locations for the sub-pixel data. Due to the relatively high cost of frame buffer memory, a need exists for a computer graphics display system that produces anti-aliased images but uses less frame buffer memory.

The present invention provides a novel memory allocation scheme and a novel sub-pixel sampling technique to reduce memory requirements and provide high quality anti-aliased images. The memory allocation scheme involves storing pixel data in the frame buffer on a per-polygon, per-pixel basis rather than storing data for each sub-pixel as discussed above. The sampling technique involves generating pixel data sub-pixels using an interlocking pixel pattern.

Pixel data is stored on a per-polygon, per-pixel basis in the frame buffer by separately storing each polygon that influences a pixel in memory locations allocated for that pixel. For example, if a pixel is influenced by two polygons, the frame buffer will contain two sets of data for the pixel, i.e., one set for each polygon. If another pixel is influenced by only one polygon, the frame buffer will contain only one set of data for that pixel. Thus, for each pixel that is influenced by at least one polygon, one set of polygon data is stored in the frame buffer for each polygon that influences the pixel.

Unlike conventional sub-pixel display systems, the polygons are not blended with other polygons as they are added to the frame buffer. Instead, each polygon that influences the pixel is stored in the frame buffer. The polygons are blended at a later stage in the pixel data generation process.

The per-polygon, per-pixel frame buffer scheme uses less memory because memory is allocated for each polygon that influences a pixel rather than for each sub-pixel associated with the pixel. In practice, each pixel is influenced by relatively few polygons. Thus, less memory is needed to store the polygon information than would be needed to store the sub-pixel information.

Turning now to the interlocking pixel pattern mentioned above, the pixel pattern is defined by sub-pixel areas, each of which is associated with a sub-pixel. The sub-pixel areas are arrayed so that some of the sub-pixel areas lie outside the area conventionally defined for the pixel and lie within a "hole" defined in the adjacent pixels' pattern. The arrayed sub-pixel areas and the holes are defined so that each part of the image plane is covered by one and only one sub-pixel area. Thus, the sub-pixel areas form a contiguous, non-overlapping tiling of the pixel image plane yet provide a wider sampling area for each pixel.

The interlocking pixel technique can increase the quality of the displayed image by reducing aliasing associated with image problems such as brightness slope discontinuities. Moreover, this technique does not significantly increase system memory requirements and can be implemented with relatively minimal impact on image processing speed.

BRIEF DESCRIPTION OF THE DRAWINGS

In the drawings which constitute a part of this specification, an exemplary embodiment exhibiting various objectives and features hereof is set forth, specifically.

DESCRIPTION OF THE ILLUSTRATIVE EMBODIMENT

As required, a detailed illustrative embodiment of the present invention is disclosed herein. However, computer graphics systems, component operating structures, frame buffer memories, polygon rendering techniques, pixel processing techniques, sampling techniques, sorting techniques and blending techniques as well as other elements utilized in accordance with the present invention may be embodied in a wide variety of forms, some of which may be quite different from those of the disclosed embodiment. Consequently, the specific structural and functional details disclosed herein are merely representative; yet in that regard, they are deemed to afford the best embodiment for purposes of disclosure and to provide a basis for the claims herein which define the scope of the present invention.

Figure 1:
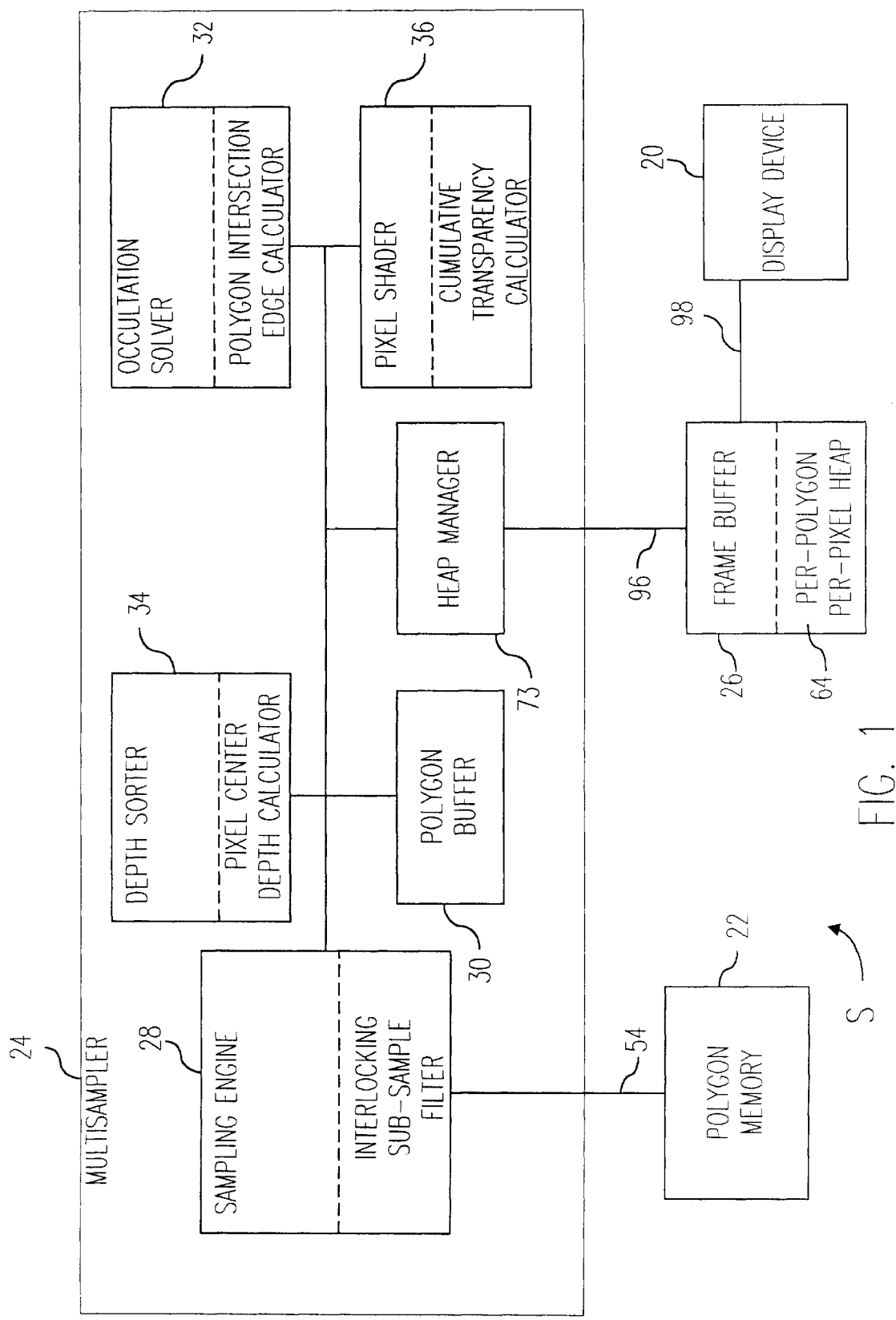
FIG. 1 is a block diagram illustrating one embodiment of a computer graphics system constructed according to the present invention.
Figure 4:
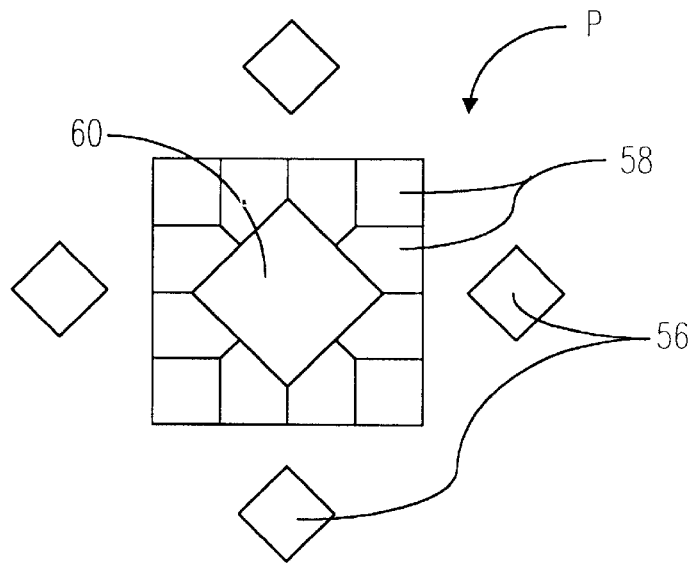
FIG. 4 is a graphic representation illustrating a sub-pixel pattern used in one embodiment of the present invention.

Referring initially to FIG. 1, one embodiment of a computer graphics system constructed in accordance with the present invention is shown. A multisampler 24 (top) processes polygons stored in a polygon memory 22 (bottom left). Initially, the multisampler 24 processes the polygons to determine which pixels are influenced by the polygons. This process uses an interlocking sub-pixel pattern P (FIG. 4). After determining which pixels the polygons influence, the multisampler 24 stores data associated with the polygons in a frame buffer 26 (bottom center) on a per-polygon, per-pixel basis. In other words, if a pixel is influenced by at least one polygon, one packet of data will be stored in the frame buffer 26 for every polygon that influences the pixel. The multisampler 24 processes these polygon data packets to generate color and intensity data for each pixel. This data is sent to a display device 20 (bottom right) to generate images on a display screen (not shown).

Figure 2:
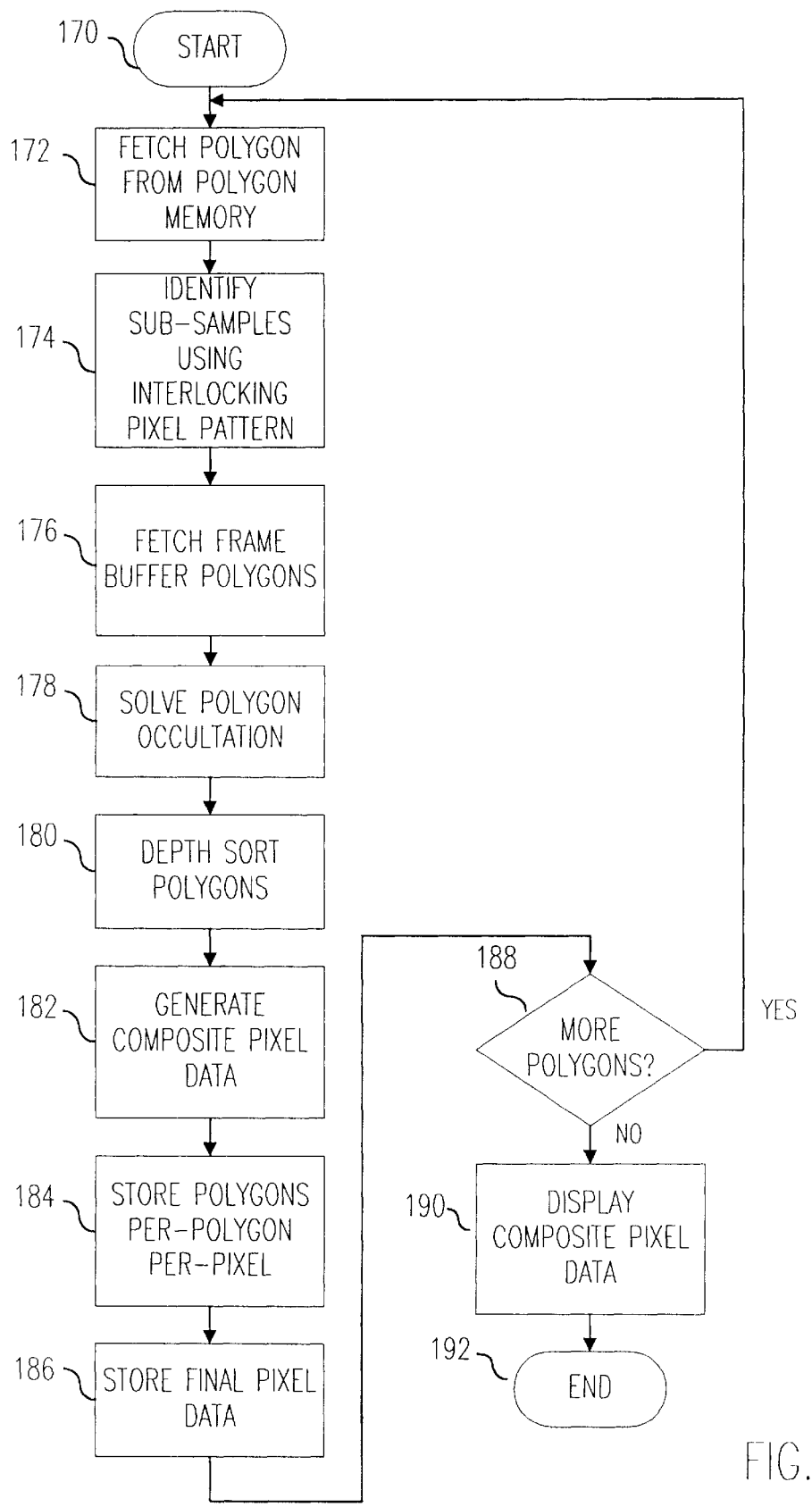
FIG. 2 is a flowchart of a pixel data generating process executed by the system of FIG. 1.

Referring to FIGS. 1 and 2, the basic operation of the disclosed embodiment will be discussed in more detail. FIG. 2 illustrates the process of generating a frame of pixel data for display. Initially, a scene to be displayed on the display device 20 (FIG. 1) is defined by a collection of polygons in a three-dimensional model space (not shown). These polygons (actually, numerical representations of the polygons) are stored in the polygon memory 22 (FIG. 1). When the polygons for a given image frame are to be displayed, the multisampler 24 processes the polygons to generate pixel data beginning at a block 170 (FIG. 2, top).

Figure 5:
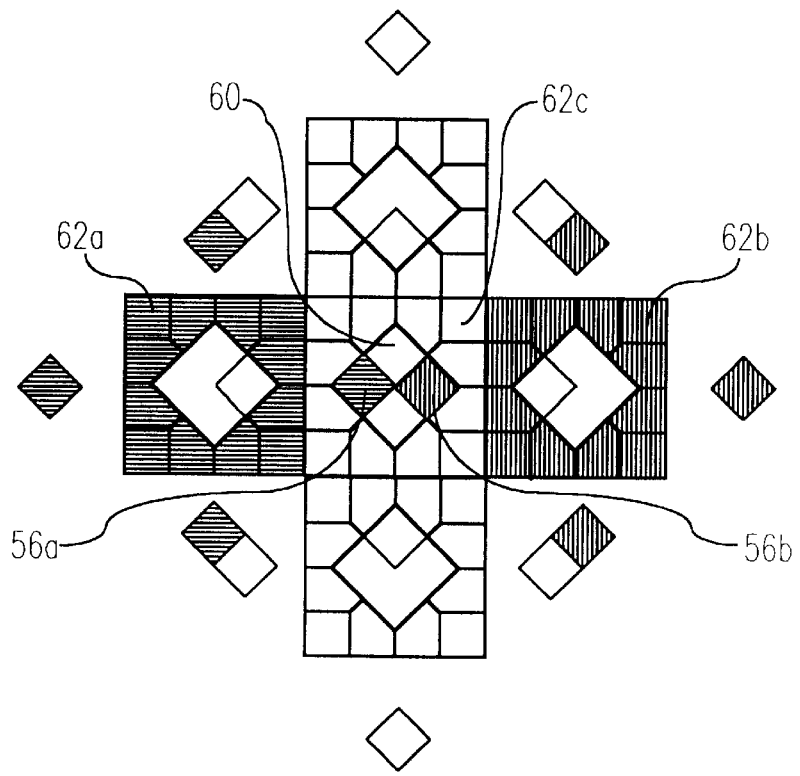
FIG. 5 is a graphic representation illustrating the interlocking nature of the sub-pixel pattern of FIG. 4.

At a block 172 (FIG. 2), the sampling engine 28 (FIG. 1, top left) retrieves a polygon from the polygon memory 22. At a block 174, using the interlocking sub-pixel pattern P (FIG. 4), the sampling engine 28 determines which pixel sub-pixels are influenced by the polygon. In the pattern P depicted in FIG. 4, four sub-pixels (e.g., sub-pixels 56) of the total sixteen sub-pixels (e.g., sub-pixels 56 and 58) are displaced laterally into screen areas normally occupied by the adjacent pixels. In turn, the pattern leaves a hole 60 in itself that each of the adjacent pixels can use. FIG. 5 shows that the pattern interlocks and tessellates properly across the image plane. The sub-pixels 56a and 56b from pixels 62a and 62b, respectively, use part of the hole 60 in pixel 62c. Thus, every portion of the image plane belongs to exactly one pixel. In practice, single sampling points would be used to sample within the sub-pixel areas depicted in FIGS. 4 and 5.

The sampling engine 28 generates a sub-pixel mask which identifies the sub-pixels influenced by the polygon. In addition, the sampling engine 28 generates color and transparency information for the pixel by interpolating polygon values at the area of the polygon that influences the pixel.

For each pixel influenced by the polygon, the sampling engine 28 sends the sub-pixel mask and polygon information to the next stage of the process. The following discussion of blocks 176 through 186 describes processing the mask and polygon information for a single pixel.

At a block 176, the multisampler 24 retrieves the polygon information of any previously processed polygons that influence the pixel currently being processed. This polygon information is stored in the frame buffer 26 on a per-polygon, per-pixel basis. The per-polygon, per-pixel relationships between pixels, polygons and frame buffer memory are illustrated in FIG. 3.

Figure 3:
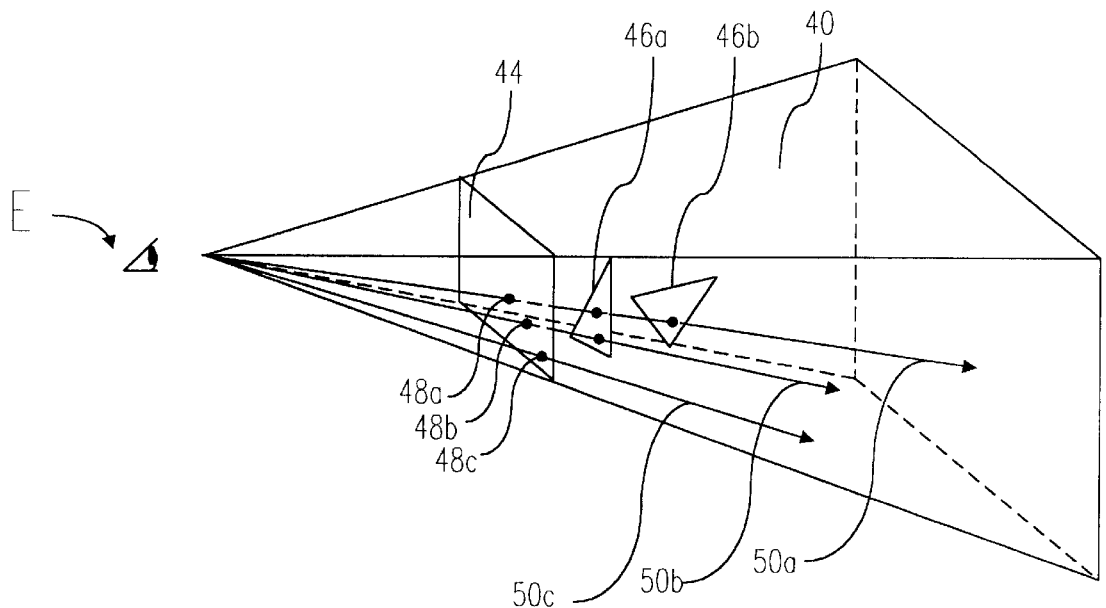
FIG. 3 is a graphic representation of a three-dimensional view frustum and a frame buffer organization illustrating operations as treated herein.
Figure 3:
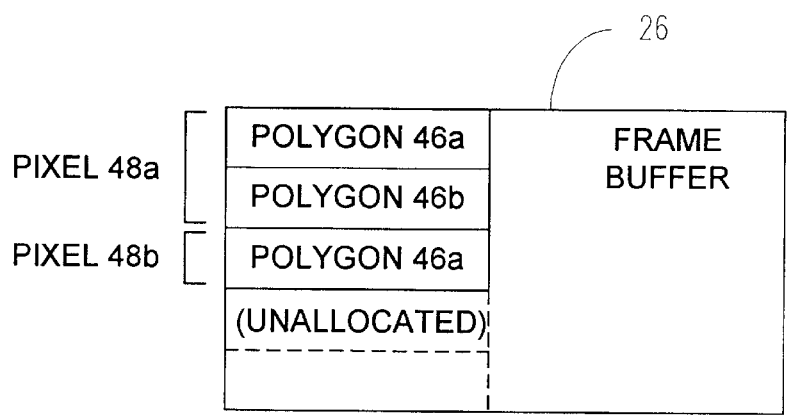

In the upper half of FIG. 3, a three-dimensional model space 40 defined by the view from an eye-point E through a display screen 44 is shown. Polygons 46a and 46b are defined in the model space 40. Rays 50a, 50b and 50c represent the line of sight from eye-point E through display screen pixels 48a, 48b and 48c, respectively. As represented by the intersection of the rays 50a and 50b with the polygons 46a and 46b, pixel 48a is influenced by polygons 46a and 46b and pixel 48b is influenced by polygon 46a. Pixel 48c is not influenced by either polygon.

The bottom half of FIG. 3 illustrates how data is stored in the frame buffer 26 for this example. Polygon information for polygons 46a and 46b is stored in the frame buffer 26 and associated with pixel 48a. Similarly, polygon information for polygon 46a is stored in the frame buffer 26 and associated with pixel 48b. No polygon information is stored in the frame buffer for pixel 48c because it is not influenced by a polygon.

Referring again to FIG. 1, the occultation solver 32 (top right) resolves hidden surface problems that arise when multiple polygons influence a single pixel (FIG. 2, block 178). Hidden surfaces are accounted for as each previously processed polygon is read from the frame buffer 26 and stored in a polygon buffer 30 (FIG. 1, center). The occultation solver 32 computes an analytic description for the edge of intersection of each new polygon and each previously processed polygon that influence the pixel. A sub-pixel matrix corresponding to this implied edge is applied to the new and previous polygon to determine which sub-pixels are influenced by which polygons. After this procedure is performed for all the previous polygons, the surviving sub-pixels for the new polygon are saved with its shade data. Special processing properly handles the interaction of opaque and transparent polygons.

At a block 180, the depth sorter 34 (FIG. 1, top middle) sorts the polygons stored in the polygon buffer 30 that influence the pixel. The polygons are sorted according to the polygons' pixel-center depth values. As new polygons are added, they are inserted into the prior list in the appropriate location. This depth ordering is later used to apply transparency effects properly.

The pixel shader 36 (FIG. 1, right middle) computes a final shade for each pixel by processing the polygons that influence the pixel in depth order (FIG. 2, block 182). It uses the sub-pixel, transparency and color information for each polygon to properly combine both color and transparency effects.

After the final shade is calculated, surviving polygons are written back to the frame buffer 26 in depth order (FIG. 2, block 184). As discussed above, these polygons are stored on a per-polygon, per-pixel basis. At a block 186, the final pixel shade is stored in the frame buffer 26.

At a block 188, if any more polygons need to be processed for the current frame, the above process is repeated for the next polygon. Once all the polygons have been processed for a frame, the final pixel shades are read from the frame buffer 26 and sent to the display device 20 which uses the final shade data to drive its illuminant pixels (block 190). Processing for this frame then terminates at a block 192.

To further an understanding of the disclosed embodiment, the components of FIG. 1 will be treated in detail. Referring again to FIG. 3, the images seen on the display screen 44 at an eye-point E are formed from the polygons in the model space 40. In practice, a polygon's characteristics such as shape, location in the three-dimensional space, color and opacity are represented by one or more data values. Prior to processing, the data values for the polygons (referred to herein simply as polygons) are stored in the polygon memory 22 (FIG. 1).

To generate images on the display screen 44, the polygons defined in three-dimensional space are mapped to pixels (e.g., pixel 48A, shown greatly exaggerated) in the two-dimensional screen. The intersection of the pixel frustum (represented in this simplified example by rays, e.g., ray 50a) with a polygon (e.g., polygon 46a) defines which portion of the polygon is mapped to the pixel. To accomplish the mapping of a polygon's characteristics to a pixel, the multisampler 24 (FIG. 1) retrieves the polygon (i.e., the numerical representation of the polygon) from the polygon memory 22 over the line 54 and, in effect, samples the polygon at sub-pixel locations corresponding to that pixel.

For each pixel that a polygon influences, the sampling engine 28 (FIG. 1) determines which sub-pixels lie inside the polygon using the polygon's edge descriptions. Each edge is characterized by its slope and a slope index is computed once per edge. The perpendicular distance from the pixel to the edge is computed once per-pixel, per-edge, then quantized and combined with the slope code to form a full sub-pixel pattern table address. This table is stored in a memory (not shown). Pattern bits for each of the three edges are read from the memory and logically "anded" together to yield the final sub-pixel mask. This mask defines the shape of the polygon within this pixel. The details of the method set forth above for determining which sub-pixels are influenced by a polygon using the polygon's edge descriptions is well known in the computer graphics art and will not be discussed further here. For example, see U.S. Pat. No. 4,918,626 (Computer Graphics Priority System With Antialiasing, Watkins, et al.).

The sampling engine 28 uses a pixel sampling pattern with arrayed sub-pixels as discussed above in conjunction with FIGS. 4 and 5. This sampling pattern is used to reduce aliasing in the displayed image. In particular, display systems that generate the final pixel color using unweighted single-pixel sampling often produce images where nearly horizontal or vertical edges tend to look "ropy" or scalloped. The present invention is based, in part, on the realization that this visual effect is caused by the manner in which the visual processing of the human eye and brain handles brightness slope discontinuities caused by the unweighted single-pixel sampling method. These brightness slope discontinuities result from a polygon having no effect on a pixel when it is not within the pixel pattern (even if the polygon is immediately adjacent to the pixel) and having maximum effect on the pixel when it covers the pixel. Thus, the polygon's effect on the pixel varies from zero to maximum in the space of one pixel.

The pixel pattern P of FIG. 4 reduces the effect these polygon discontinuities have on a pixel. First, the polygon influences the pixel over a wider area. Second, the pattern sub-pixel density varies across the pattern. As a result, the polygon influences the pixel sooner and has more effect on the pixel the closer the polygon is to the pixel. Consider, for example, a horizonal polygon edge as it approaches the bottom of the pixel pattern of FIG. 4. Initially, the edge is immediately below the bottom of the pixel, takes no sub-pixels and has no effect on the display video. As the edge moves upward, the polygon influences one sub-pixel after the edge traverses a distance of approximately one half of a pixel (as measured by a conventional square pixel). As the edge traverses the next one half pixel width, the polygon influences more sub-pixels. Finally, as the edge traverses the last one half pixel width, the polygon affects the last sub-pixel. Thus, the polygon's effect on the pixel "ramps up" as the polygon edge approaches and eventually occults the pixel and ramps down as the polygon edge moves past the pixel. Moreover, the polygon influences the pixel over a distance of more than one and a half pixels. By softening the discontinuities in this manner, the ropy or scalloped edge effects discussed above are greatly reduced.

The disclosed embodiment achieves these results without the architectural complexity of a multi-pixel shaped filter and without using more than one pixel of sub-pixels. Typically, a multi-pixel shaped filter computes the final pixel color from a weighted average of the scene detail in a two-by-two set of pixels. However, generating the weighted averages in these systems typically requires relatively high computational power and appropriate data cross-links between adjacent pixels. In contrast, pixel-to-pixel cross-links are not required in the disclosed embodiment because it uses a single pixel of sub-pixels. Moreover, because the sub-pixels are interlocked, a wider area is sampled without the use of additional sub-pixels for each pixel.

The implementation cost of the disclosed embodiment is quite low. The active distance of the filter is a little larger, so the scan conversion process needs to overscan polygons by a fraction of a pixel. However, this capability is already needed to support some graphics Application Programmer Interface modes. In addition, a few more distance codes may need to be in the pattern memory. However, the downstream processes are unaffected because the final filtering process still uses equal, or "flat," weighting. In sum, this sampling technique provides improved visual displays with relatively low additional cost.

The sampling engine 28 generates the color and transparency data for the pixel by scan converting the polygons retrieved from the polygon memory 22. Basically, data values for the pixel are generated by calculating the respective values at the location on the polygon that corresponds to the pixel. Typically, this involves interpolating a value using the values defined at the polygon's vertices. The scan conversion process is well known in the computer graphics system art and is discussed, for example, in the books *Principles of Interactive Computer Graphics,* 2nd Edition, Newman and Sproull, McGraw-Hill Book Company, 1979, and *Computer Graphics: Principles and Practice,* 2nd Edition, Foley, van Dam, Feiner & Hughes, Addison-Wesley Publishing Company, 1991.

After the sampling engine 28 calculates the sub-pixel mask and polygon information using the techniques described above, it sends this data to the next stage of the multisampler 24. The multisampler 24 stores the mask and polygon information in the frame buffer 26. Accordingly, the organization and operation of the frame buffer 26 will now be treated.

A portion of the frame buffer 26 is allocated to store pixel-specific information associated with the active video screen. This information includes the pixel video color (which is typically double buffered), stencil and other combining information. In addition, heap management information for the polygons influencing the pixels is stored here. Typically, this portion of the frame buffer is addressed by pixel row and column values, with appropriate window offsets and other addressing information. The details of these aspects of the frame buffer are well known in the computer graphics art and will not be discussed here.

A second portion of the frame buffer 26 stores the mask and polygon information generated by the sampling engine 28 as discussed above. Typically, this data includes the color, opacity, depth value and depth gradients for the polygon and a sub-pixel use mask which describes which pixel sub-pixels are influenced by the polygon. This information is stored in the frame buffer 26 on a per-polygon, per-pixel basis. In other words, each pixel will have one set of the above information stored in the frame buffer 26 for every polygon that influences that pixel.

This portion of the frame buffer memory is managed as a heap 64 (FIG. 1). Each new polygon discovered within a pixel is given an increment of memory in which to store its shade and occultation information and pointer links that are used to connect the various polygons that influence each pixel. These pointer links allow prior polygons for a given pixel to be quickly retrieved as the effects of a new polygon are added. The heap portion of the memory is managed in polygon-per-pixel data packets.

Figure 6:
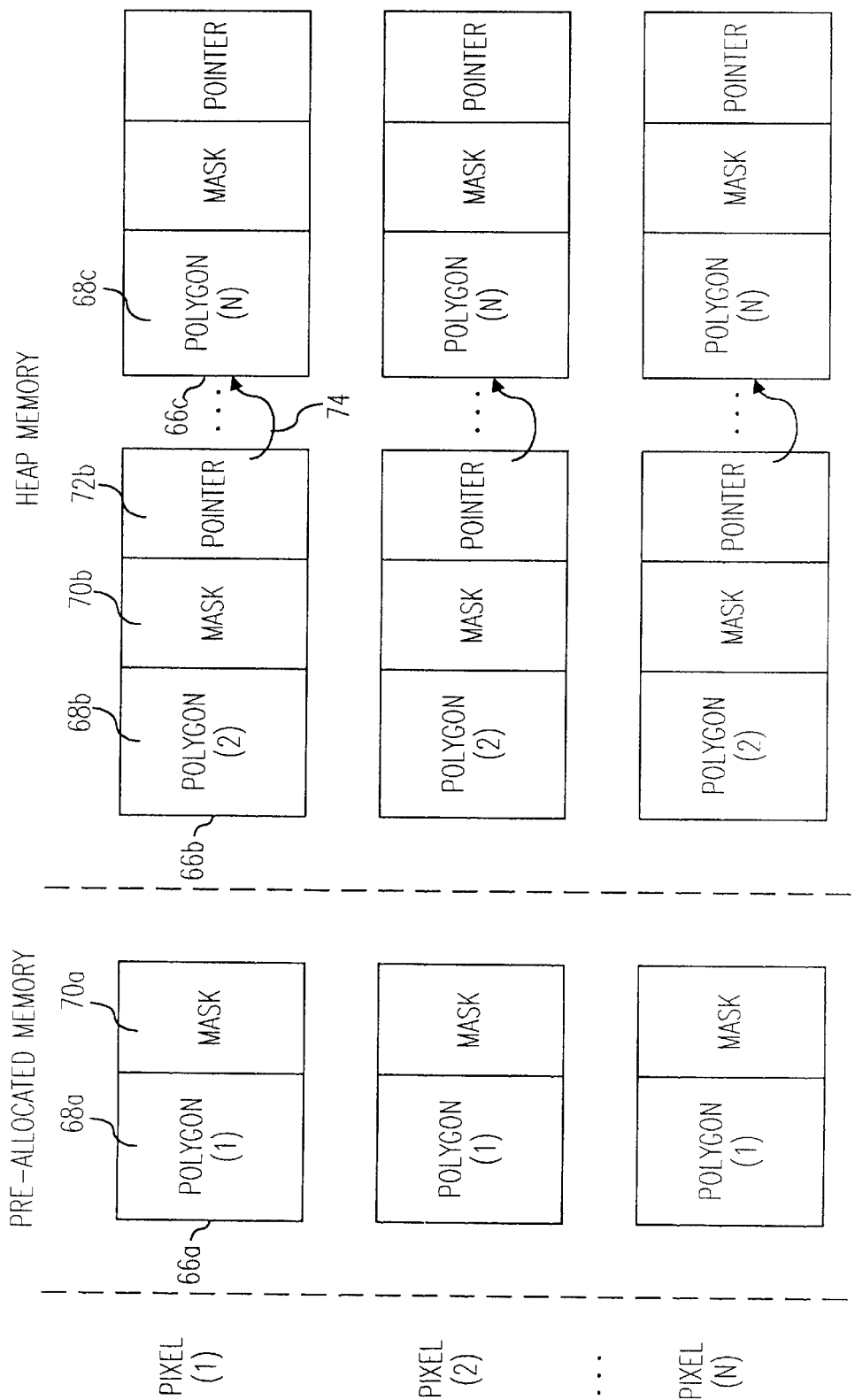
FIG. 6 is a graphic representation of memory organization in one embodiment of a frame buffer as treated herein.

FIG. 6 graphically illustrates data packets in an exemplary embodiment of a frame buffer that has a portion of it organized as a heap. For each pixel influenced by a polygon (designated PIXEL(1) through PIXEL(N)), one or more data packets (e.g., data packets 66b and 66c) are stored in the frame buffer 26. One data packet is stored for each polygon that influences a given pixel. For example, data packet 66b contains the information for one polygon that influences PIXEL(1). Data packet 66c contains the information for another polygon that influences PIXEL(1). As discussed above, each data packet typically contains polygon information (e.g., box 68b), a sub-pixel mask (e.g., mask 70b), and a pointer to the next data packet (e.g., pointer 72b). As represented by the line 74, the pointer contains the frame buffer memory address of the next data packet associated with the same pixel. For example, pointer 72b would contain the address for data packet 66c.

The heap data packets and the associated pointers are managed by a heap manager 73 (FIG. 1, center). The heap manager 73 initializes the heap pointers at the start of every frame and allocates new data packets as needed during the rendering process. The heap pointers are valid up to the maximum number of polygons within the pixel. This maximum is initialized at the start of each frame.

In one embodiment, the heap manager 73 does not attempt to reclaim heap space during frame processing even though heap space is vacated whenever a new polygon completely obscures a prior one within a pixel. Instead, the pixel-specific portion of the memory (discussed above) contains two values which indicate how many polygons are currently active within the pixel and what the maximum number of active polygons has ever been during the current frame. When the number of currently active polygons is less than the maximum number of active polygons, heap space has been allocated, used, and abandoned by prior polygons. In this case, the embedded heap pointers are still valid because the heap location of an obscured polygon remains linked to the pixel for the remainder of the frame. Thus, if another polygon needs to be added for this pixel, the memory is already allocated and linked in. Consequently, a modest level of heap re-use is provided without the complexity of heap reclamation.

The heap manager 73 provides for two types of heap overflow. The first type involves overflow of the internal buffers. Since the multisampler 24 reads all prior polygons associated with the pixel before it begins shade computations, internal buffers are provided to store the polygon data packets. When a pixel contains too many polygons, the system uses the allowable number of polygons, from closest to farthest (based on the depth sort order), and drops the farthest one. These polygons will be dropped one at a time because the system does not output an excessive number of polygons back to the frame buffer 26.

The second type of overflow involves overflow of the heap space. If the system runs out of heap space, subsequent pixel processing continues and, for each pixel that needs additional space, the farthest polygon gets dropped on output. This might not leave the pixel properly shaded, depending on whether any other polygons were dropped within this pixel. Nevertheless, the possibility of heap overflow is lessened somewhat because new polygons often make their own heap space by completely occulting a prior polygon and freeing up its data packet.

In one embodiment of the present invention, a portion of the frame buffer memory is pre-allocated to pixels that are influenced by only a few polygons. In FIG. 6 (left), the memory for data packet 66a is pre-allocated and is not part of the heap. Thus, the information (e.g., box 68a and mask 70a) for the first polygon that influences the pixel will always be stored here. This technique increases the rate at which these data packets are accessed because no heap processing is performed when the packets are stored or retrieved. Memory can be pre-allocated for as many pixels as needed. Thus, the "N" in PIXEL(N) represents the number of pixels that have memory pre-allocated for them. In addition, memory may be preallocated for more than one data packet for each pixel if needed.

In another embodiment, a portion of the available frame buffer memory is pre-allocated to store the first polygon data packet for each pixel. Here, it is assumed that every portion of the screen will be influenced by at least one polygon. FIG. 6 illustrates this organization where the "N" in PIXEL(N) represents the total number of pixels. As above, this technique increases the rate at which these packets are accessed because no heap processing is performed.

The per-polygon, per-pixel memory allocation scheme discussed above can reduce frame buffer memory requirements by 50% to 75% over frame buffer memory allocation schemes that allocate memory for every sub-pixel in every pixel. This memory savings is realized because memory is allocated for each polygon that influences the pixel rather than for each pixel sub-pixel. Since typical multisampling applications use 16 sub-pixels per pixel but average only a few polygons per pixel, less memory is needed to store the polygon information than the sub-pixel information.

Except for specially constructed, deliberately pathological test images, it has proven very difficult to overrun a local buffer maximum of sixteen polygons. It has also proven very difficult to exceed a heap allocation corresponding to an average of four polygons per pixel. For most imagery, an average of three polygons per pixel is normal. Moreover, high quality images are typically produced using an average of less than two polygons per pixel.

When the heap limits are exceeded, the visual effect of dropping the farthest polygon is not necessarily catastrophic. Typically, the observed image degradation has been fairly subtle. In any event, if a user needs a system where the heap is essentially never overrun, the system can be configured with storage several times over the baseline limits.

Referring again to FIG. 1, the remaining components of the multisampler 24 will be discussed. These components process the polygons and masks generated by the sampling engine and stored in the frame buffer. As discussed below, this process involves resolving polygon occultations, sorting the polygons and blending the polygons to generate pixel data.

The occultation solver 32 (FIG. 1) compares the polygons that influence a given pixel to determine whether any of these polygons occult each other. As FIG. 3 illustrates, one polygon (e.g., polygon 46a) may be in front of another polygon (e.g., polygon 46b) in the model space. When this occurs, some of the sub-pixels of the farthest polygon may be occulted by the nearest polygon.

As each new polygon is output by the sampling engine 28, the occultation solver 32 compares the new polygon with any previously processed polygons (the "prior polygons") that influence the pixel being processed. This comparison is done one polygon at a time as the prior polygons are read from frame buffer memory into local buffers. When a polygon's sub-pixel is occulted by another polygon, the occultation solver 32 modifies the occulted polygon's coverage mask to reflect that this polygon no longer influences that sub-pixel.

The occultation solver 32 compares the polygon sub-pixels as follows. The depth at a particular sub-pixel is the depth at the pixel center, plus the relative offsets of the sub-pixel from the pixel center (in X and Y), times the respective gradient values (in X and Y). This is reformulated to reduce the amount of computation required to compare the sub-pixel depths. Initially, the new polygon's and the prior polygon's pixel-center depth values and depth gradient values are subtracted from each other. This calculation only needs to be done once per pixel. Then, the depth test at each sub-pixel is simply the depth difference at the pixel center, plus the gradient differences times the sub-pixel offsets:

$$Ds=(Dn-Dp)+(DXn-DXp)*Xs+(DYn-DYp)*Ys \qquad \text{EQUATION 1}$$

Where Ds, Dn and Dp denote the depth values of the sub-pixel, the new polygon and the prior polygon, respectively. DXn, DYn, DXp and DYp denote the "X" and "Y" direction depth gradient values for the new polygon and prior polygon, respectively. Xs and Ys denote the sub-pixel offsets in the "X" and "Y" directions, respectfully. Since the depth value D is 1/Z and hence gets smaller with range, if Ds is positive, the new polygon is closer and should be given visual precedence over the prior polygon.

Further efficiencies are obtained based on the realization that the above equation is in the form of a line equation:
$$AX+BY+C=0,$$

where
$A=DXn-DXp,$
$B=DYn-DYp$ and
$C=Dn-Dp.$

Specifically, the line equation is the line of intersection of the two polygons as defined by their depth and gradient information. On one side of this line, the new polygon is visible. On the other side of the line, the prior polygon is visible. A and B are the components of a vector that points normal to the edge, towards the new polygon's side of the three-dimensional space. When the equation is normalized by dividing A, B and C by the square root of $A^2+B^2$, C is equal to the perpendicular distance, in pixel units, from the pixel center to the edge. Thus, A and B can be used to develop an edge slope code, combined with the perpendicular distance and used to look up the sub-pixel pattern corresponding to the edge of intersection. This process is identical to the one used in the sampling engine 28 and can, in fact, make use of the same pattern table information. See, for example, U.S. Pat. No. 4,918,626, cited above.

The pattern retrieved from the table has sub-pixels set where the new polygon prevails. The pattern is logically "anded" with the new polygon's sub-pixels to define the condition where the new polygon exists and the new polygon prevails. The inverse of the "new polygon exists and prevails" pattern is "anded" with the prior polygon to eliminate any sub-pixels of the prior polygon that are claimed by the new polygon. In other words, the prior polygon's sub-pixels that are occulted by the new polygon's sub-pixels are removed from the prior polygon's sub-pixel mask.

Next, the inverse of the pattern retrieved from the table is "anded" with the prior polygon to define the condition where the prior polygon exists and the prior polygon prevails. The inverse of the "prior polygon exists and prevails" pattern is "anded" with the new polygon to eliminate any sub-pixels that are claimed by the prior polygon. Thus, the new polygon's sub-pixels that are occulted by the prior polygon's sub-pixels are removed from the new polygon's sub-pixel mask.

In the process above, an opaque polygon occults everything behind it by erasing the conflicting sub-pixel bits for the polygons behind it. In contrast, a transparent polygon does not occult anything. Thus, the new polygon's sub-pixel mask is modified as described above only if the prior polygon is opaque. Similarly, the prior polygon's sub-pixel mask is modified only if the new polygon is opaque.

The procedure set forth above provides an efficient method of eliminating hidden surfaces. In comparison, it has been proposed to eliminate hidden surfaces by computing the depth values for each sub-pixel of the new and prior polygons, then keeping the closest sub-pixels and erasing the farthest ones. The depth and depth-gradient values associated with the polygon data make this approach straightforward. However, this approach typically requires substantial processing to perform the necessary calculations. In contrast, the disclosed procedure requires less processing by utilizing the shortcuts discussed above.

Figure 7:
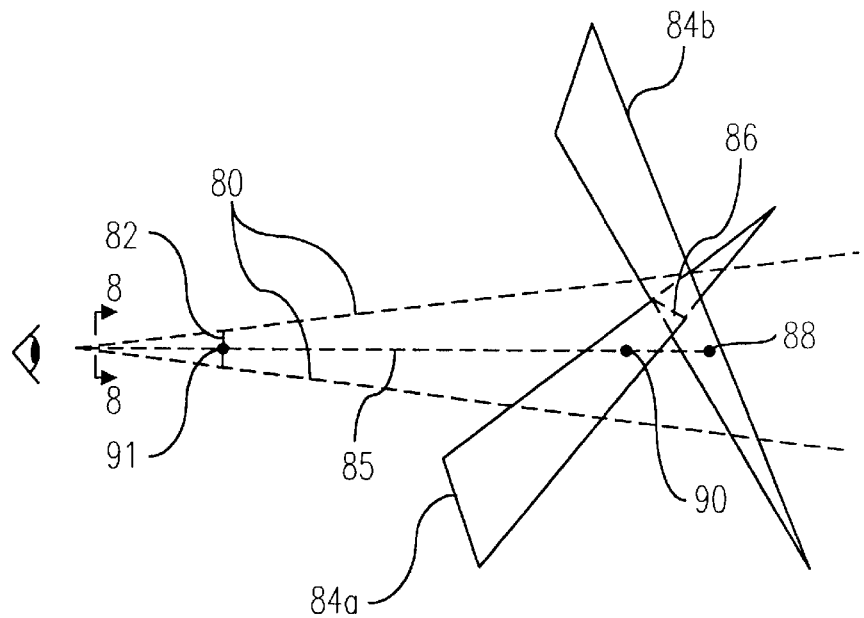
FIG. 7 is a side view of a pixel frustum in a model space as treated herein.

After the occultation solver 32 eliminates hidden polygon surfaces, the depth sorter 34 (FIG. 1) sorts the polygons according to the relative depth of the polygons in the model space. The depth sorter 34 sorts the polygons as each new polygon is sent from the sampling engine 28. As each prior polygon is read from the frame buffer 26, the prior polygon's pixel-center depth is compared with the new polygon's pixel-center depth value. For example, referring to FIG. 7, a side view of a pixel frustum defined by the view from eye-point E through a pixel 82 along lines 80 is shown. In the center of pixel 82 (designated by line 85), polygon 84a is in front of polygon 84b. Thus, polygon 84a would be placed ahead of polygon 84b in the list. By the time all prior polygons have been read into temporary buffers, the proper insertion point for the new polygon has been determined. When the surviving polygons are written back to the frame buffer 26, they will be arranged in this new order. Thus, the prior polygons that accumulate for a pixel are always resident in the frame buffer 26 in their pixel-level depth sort order. New polygons simply are merged into the proper place in the list.

This procedure provides an efficient method of sorting polygons. In comparison, a rigorous depth ordering solution would require ordering on a per-sample basis. For example, all the polygons using sample 5 would be ordered into a depth list unique to sample 5. This approach leads to a pixel shader process complexity that grows non-linearly with the number of polygons in a pixel. In contrast, the procedure set forth above requires only a pixel-level depth sort and yields a linear pixel shader process time.

Figure 8:
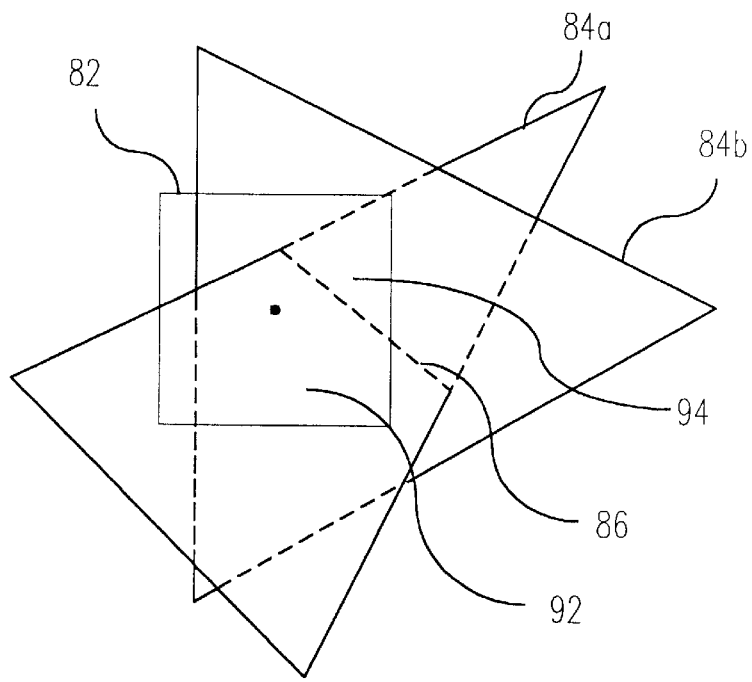
FIG. 8 is a sectional view from the eye-point of FIG. 7 taken along line 8—8 of FIG. 7.

After the polygons for a pixel have been processed by the occultation solver 32 and the depth sorter 34, the pixel shader 36 (FIG. 1) processes the polygon information to generate the final shade for each pixel. As FIG. 8 illustrates, a pixel may be influenced by more than one polygon. For example, if a semi-transparent polygon (e.g., polygon 84a) is in front of another polygon (e.g., polygon 84b), both polygons will contribute to the pixel. Similarly, if two opaque polygons each occupy a portion (e.g., areas 92 and 94) of the pixel, the effects of both polygons should be taken into account when calculating the pixel shade.

Figure 10A:
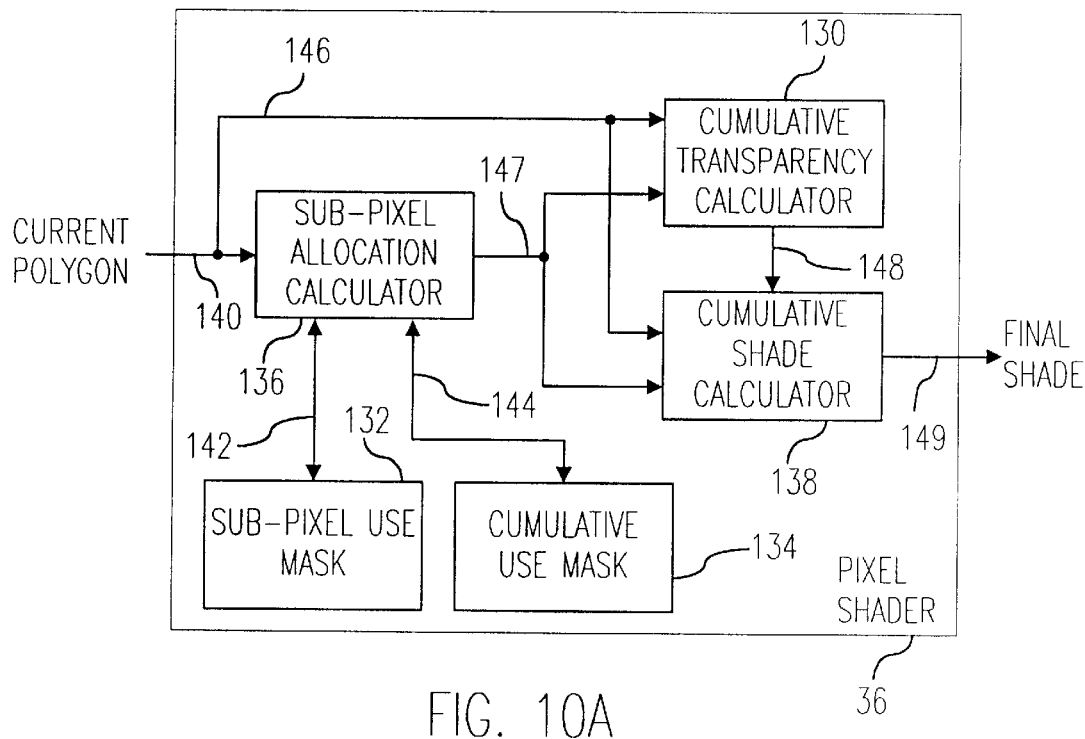
FIGS. 10A and 10B are block diagrams illustrating two embodiments of a pixel shader according to the present invention.

The pixel shader 36 accumulates shade and transparency effects in depth-sort order. One embodiment of the pixel shader 36 is depicted in FIG. 10A. A cumulative transparency calculator 130 develops a cumulative transparency for each level in the sorted polygon list using sub-pixel use masks 132 and cumulative use sub-pixel masks 134 generated by a sub-pixel allocation calculator 136. A cumulative shade calculator 138 uses the cumulative transparency values to calculate how much of the current polygon should be affected by prior transparency and how much should show through unaltered. The values are computed for each new level from the previous level's values.

The cumulative mask is the logical "or" of the prior-level cumulative mask with the current polygon sub-pixel mask. Table 1 illustrates sub-pixel use masks and cumulative use masks for five levels (polygon 0–polygon 4). The sub-pixel allocation calculator 136 also generates various mask bit counts and polygon level identifiers (designated A–E in TABLE 1) that the pixel shader uses to generate the final pixel shade. "A" designates the number of active sub-pixels (as represented by the cumulative sub-pixel use mask) at the current level. "B" designates the nearest prior level where the cumulative use mask has at least one sub-pixel bit set which is also set in the current level. "C" designates the number of sub-pixels used by the current polygon that are not used by any prior polygons. "D" designates the number of sub-pixels used by both the current polygon and at least one prior polygon. "E" designates the number of sub-pixels used by any prior polygons that are not used by the current polygon.

TABLE 1

| | SUB-PIXEL USE MASKS | CUMULATIVE USE MASKS | A | B | C | D | E |
|---|---|---|---|---|---|---|---|
| poly4: | 1111110000000011 | 1111111111111111 | 16 | 3 | 0 | 8 | 0 |
| poly3: | 0001110000000011 | 1111111111111111 | 16 | — | 5 | 0 | 11 |
| poly2: | 0000001111111100 | 1110001111111100 | 11 | 1 | 0 | 8 | 0 |
| poly1: | 0000001100001100 | 1110001111111100 | 11 | — | 4 | 0 | 7 |
| poly0: | 1110000011110000 | 1110000011110000 | 7 | — | — | — | — |

Figure 11A:
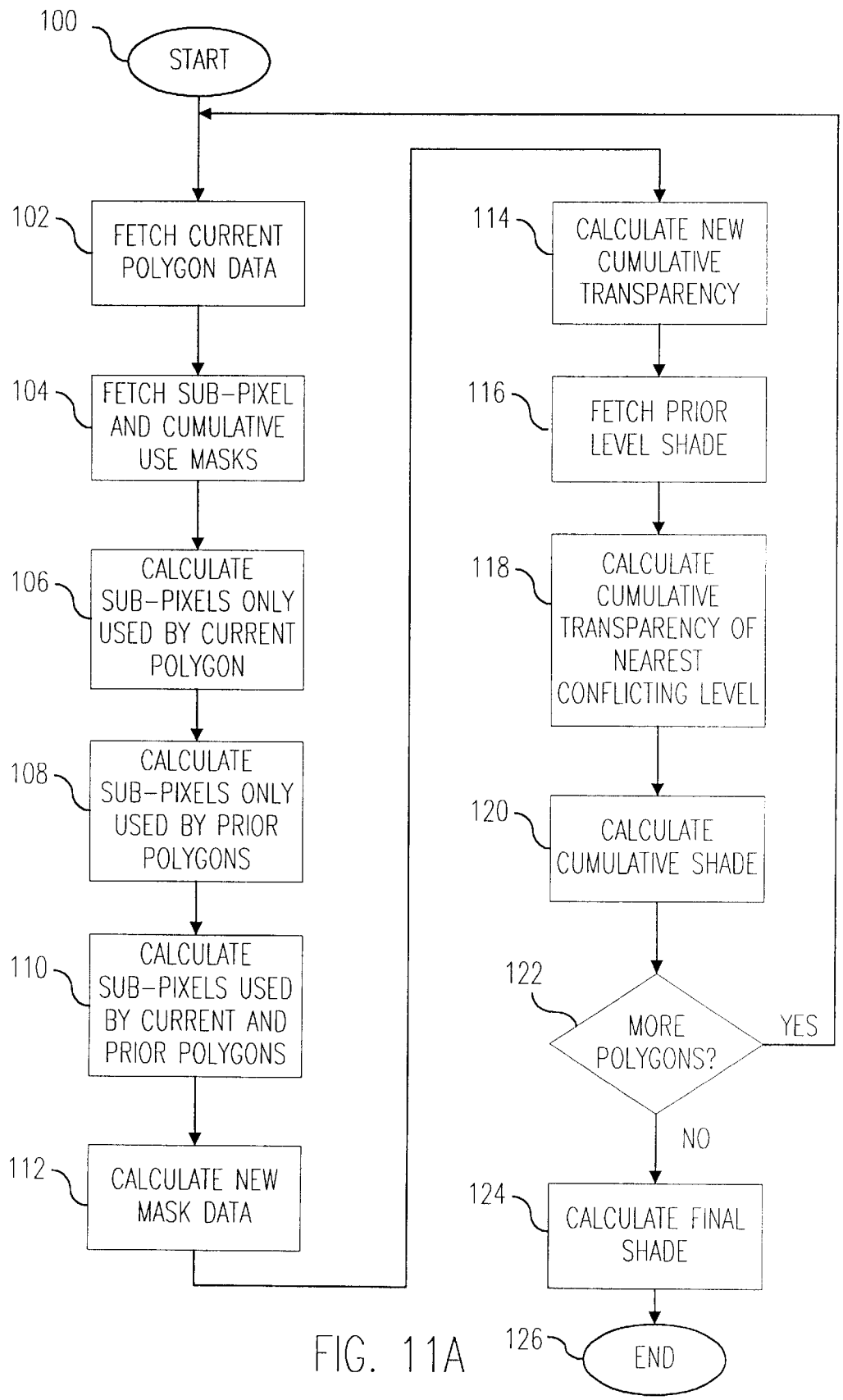
FIGS. 11A and 11B are flowcharts of pixel shading processes executed by the embodiments of FIGS. 10A and 10B, respectively.

Starting at a block 100, FIG. 11A illustrates how the pixel shader 36 of FIG. 10A generates a shade for a pixel. Basically, the pixel shader 36 calculates the use masks and cumulative transparency and uses these values to generate the final pixel shade. At a block 102, the pixel shader 36 retrieves the data for the current polygon from the polygon buffer over a line 140 (FIG. 10A). This data includes the sub-pixel mask and polygon information generated by the sampling engine 28 (FIG. 1) as discussed above.

At a block 104, the pixel shader retrieves the prior sub-pixel masks 132 and cumulative use masks 134 over lines 142 and 144, respectively. These masks were generated when the previous polygons in the list were processed.

At blocks 106, 108 and 110, respectively, the sub-pixel allocation calculator 136 calculates and stores the values for "C", "C" and "D" (TABLE 1) for the current level. In addition, the sub-pixel allocation calculator 136 calculates and stores the new cumulative use mask, the current polygon's sub-pixel mask and the value for "A" (block 112).

At a block 114, the pixel shader retrieves the cumulative transparency for the prior level and calculates and stores the cumulative transparency for the current level. The current level cumulative transparency is a weighted average of all prior transparent and opaque polygons. For the first polygon in the list, the cumulative transparency is simply:

$$CT(0) = 1 - op(0) \qquad \text{EQUATION 2}$$

Where CT(0) and op(0) are the cumulative transparency and opacity of the polygon at level 0, respectively. The cumulative transparency calculator 130 accesses the current polygon's opacity data over a line 146 (FIG. 10A).

For subsequent polygons in the list, the cumulative transparency is:

$$CT(n) = (CT(n-1)*(D(n)*op(n)+E(n))+C(n)*op(n)) \div A(n) \qquad \text{EQUATION 3}$$

Where "n" is the current level and CT(n) is the cumulative transparency for the current level. The bit counts are sent to the cumulative transparency calculator 130 over a line 147 (FIG. 10A).

The cumulative transparency is the sum of two terms, one due to current sub-pixels that are not behind any other polygon, and the other due to current sub-pixels that are hidden by prior polygons. The first term is the prior level transparency (CT(n−1)) times the sum of the number of sub-pixel bits (D(n)) that are used by both the current level polygon and at least one prior polygon times the current polygon's opacity (op(n)) plus the number of sub-pixel bits used only by the prior polygons (E(n)). The second term is the current polygon's opacity times the number of sub-pixel bits used only by the current polygon (C(n)). These terms are weighted by their respective number of sub-pixels, added together, then divided by the total number of active sub-pixels at the current level (A(n)) to normalize the result.

After the current level's cumulative transparency is calculated, the cumulative shade calculator 138 generates the cumulative pixel shade starting at a block 116 (FIG. 11A) by retrieving the cumulative shade generated for the prior level. At a block 118, as each polygon in the list is processed, the pixel shader 36 finds the nearest prior level in the list that has samples that conflict with the polygon being processed. This is done by comparing the current polygon sub-pixel mask with each of the prior cumulative masks and identifying the closest level that has bits in common with the current level.

At a block 120, the cumulative shade calculator 138 combines the current polygon's shade with the prior cumulative shade. The current polygon's sub-pixel bits are divided into two sets: those that overlap bits in the nearest prior cumulative level and those that do not (and hence are not obscured by any prior polygon). Unobscured sub-pixels are counted, and their contribution to the display video is the current polygon color (color(n)) times its opacity (op(n)) times this count (C(n)) (EQUATION 5). The overlapping sub-pixel bits are counted, and their contribution to the display video is equal to the current polygon color times its opacity times the cumulative transparency (CT(B)) of the nearest prior conflicting level (B) times the overlap count (D(n)). The current polygons's color and opacity are accessed over the line 146. The bit counts are sent to the cumulative shade calculator 138 over the line 147 (FIG. 10A). The cumulative transparency of the nearest conflicting level is accessed over a line 148.

For the first polygon in the list, the shade at level 0 (S(0)) is:

$$S(0) = op(0) * color(0) * a(0) \quad \text{EQUATION 4}$$

The cumulative shade is generated for each polygon that influences the pixel being processed (block 122). For polygons at levels other than level 0 in the list, the cumulative shade (S(n)) is:

$$S(n) = S(n-1) + (C(n) + D(n) * CT(B)) * op(n) * color(n) \quad \text{EQUATION 5}$$

After all the polygons have been processed, the pixel shader 36 generates the final pixel shade and outputs it over a line 149 (block 124). The final pixel shade (S(final)) is equal to the final cumulative shade divided by the number of sub-pixels:

$$S(final) = S(last) \div A(last) \quad \text{EQUATION 6}$$

Where S(last) is the cumulative shade at the last level and A(last) is the number of sub-pixels used by all the levels. Typically, A(last) is equal to the total number of sub-pixels in a pixel (e.g., 16). However, in some applications (e.g., workstations), A(last) will be less than the total number of sub-pixels. The pixel shader process terminates at a block 126.

Figure 10B:
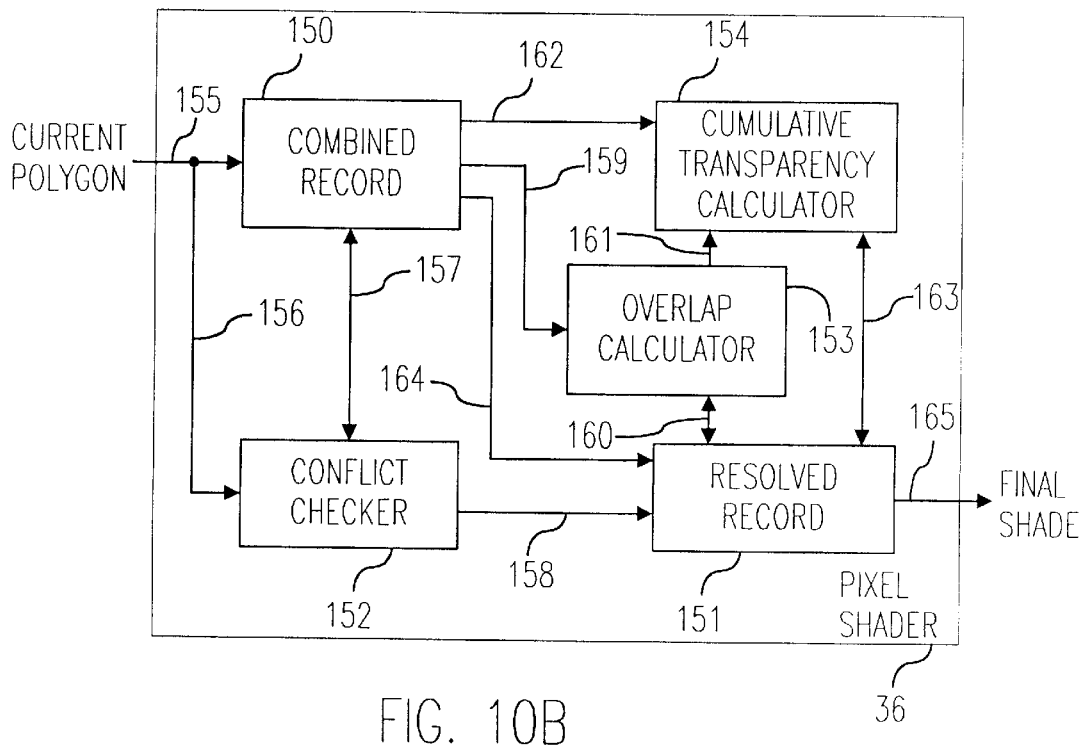

An alternative embodiment of the pixel shader 36 is depicted in FIG. 10B. As in the embodiment of FIG. 10A, cumulative transparency data and cumulative shade data are generated as the polygons are processed in depth sort order. However, the cumulative shade is generated from a cumulative combined record 150 and a cumulative resolved record 151. The cumulative records are blended based on sub-pixel conflicts detected by a conflict checker 152 and an overlap calculator 153. As above, the pixel shader 36, uses cumulative transparency values generated by a cumulative transparency calculator 154 to calculate how much of the current polygon should be affected by prior transparency and how much should show through unaltered.

Figure 11B:
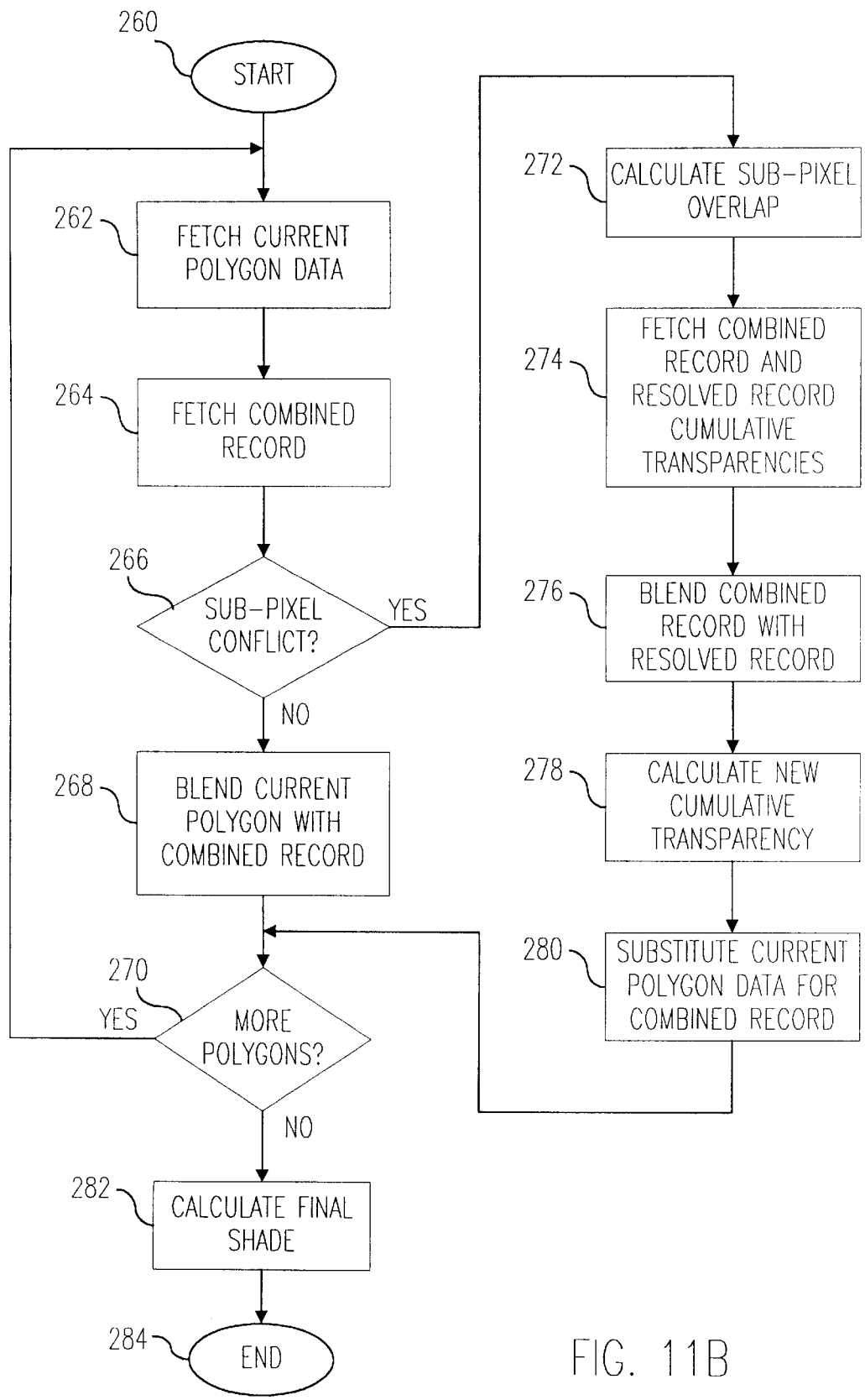

The operation of the pixel shader of FIG. 10B is illustrated in FIG. 11B starting at a block 260. Initially, the combined record and resolved record storage is cleared before any polygons are processed. The color values for the polygon are multiplied by the opacity of the polygon before they are passed to the section of the pixel shader 36 that performs the final transparency calculations. For example, a white polygon with 25% opacity would have color values (red, green, blue and alpha) of 0.25.

At a block 262, polygon data for the current polygon is provided on a line 155 (FIG. 10B). Conflict checker 152 accesses the polygon's coverage mask bits over a line 156 and compares them with mask bits retrieved from the aggregate combined record 150 over a line 157 (block 264). At a block 266, if there are no coverage mask bits that conflict, the process proceeds to a block 268 where the conflict checker 152 sends a signal to the combined record 150 over the line 157 indicating that the polygon is to be blended with the aggregate combined record.

When a polygon is blended into the combined record 150, the contribution of the polygon is weighted by the number of bits set in the polygon's coverage mask. For example, the new combined record red color data (CbRecRed) is:

$$CbRecRed = CbRecRed + PolyRed * SetBits(PolyMask) \quad \text{EQUATION 7}$$

Where the CbRecRed to the right of the equal sign is the prior combined record red color, PolyRed is the polygon's red color data value and SetBits(PolyMask) is the number of bits set in the polygon's coverage mask (PolyMask). Similar equations are used for the green, blue and alpha components of the color information.

The new combined record transparency (CbRecCumTran) is:

$$CbRecCumTran = CbRecCumTran + PolyTran * SetBits(PolyMask) \quad \text{EQUATION 8}$$

Where the CbRecCumTran to the right of the equal sign is the prior combined record cumulative transparency. PolyTran is the polygon's transparency which is equal to 1—"the polygon's opacity value."

Finally, the new combined record mask (CbRecMask) is set to the logical "or" of the polygon's coverage mask and the combined record's current mask.

If any of the same mask bits were set in the two masks at block 266, the process proceeds to a block 272 instead of block 268. The conflict checker 152 sends a signal to the resolved record 151 over a line 158 indicating that the aggregate combined record 150 is to be blended into the resolved pixel record 151.

When a combined record is added to the resolved record, the contribution of the combined record is weighted by the number of bits set in the combined record's cumulative mask. The contribution of the combined record for those sub-pixels that are in conflict is reduced based on the current cumulative transparency stored in resolved record (RsvRecCumTran). At block 272, the overlap calculator generates bit counts using the combined record mask and resolved record mask (RsvRecMask) which are accessed over lines 159 and 160, respectively. These bit counts (Conflict, UncnOld and UncnNew) are sent to the resolved record and the cumulative transparency calculator over lines 160 and 161, respectively. These bit counts are calculated as follows:

$$\text{Conflict} = \text{SetBits}(\text{RsvRecMask AND CbRecMask}) \quad \text{UncnOld} = \text{SetBits}(\text{RsvRecMask AND (NOT CbRecMask)}) \quad \text{UncnNew} = \text{SetBits}((\text{NOT RsvRecMask}) \text{ AND CbRecMask}) \qquad \text{EQUATION 9}$$

Where "AND" and "NOT" are the corresponding logic operations.

At a block 274, the pixel shader 36 fetches the cumulative transparencies for the combined record and the resolved record over lines 162 and 163, respectively. These transparencies were stored the last time the combined record and the resolved record were blended.

At a block 276, the combined record shade (accessed over a line 164) is blended with the resolved record shade. Using the red color data as an example, the new resolved record red color data (RsvRecRed) is:

$$\text{RsvRecRed} = \text{RsvRecRed} + (\text{CbRecRed} \div \text{SetBits}(\text{CbRecMask})) * \text{Conflict} * \text{RsvReaCumlTran} + (\text{CbRecRed} \div \text{SetBits}(\text{CbRecMask})) * \text{UncnNew} \qquad \text{EQUATION 10}$$

Again, similar equations are used for the green, blue and alpha components.

The new value of the cumulative transparency for the resolved record calculated at a block 278 is the weighted sum of three terms: (1) the cumulative transparency of resolved record (RsvRecCumlTran) weighted by the number of nonconflicting old sub-pixels (UncnOld); (2) the product of the transparency of resolved record (RsvRecCumlTran) and the transparency of combined record (CbRecCumlTran) weighted by the number of conflicting sub-pixels between the two records (Conflict); and (3) the cumulative transparency of combined record (CbRecCumlTran) weighted by the number of nonconflicting new sub-pixels (UncnNew):

$$\text{RsvRecCumlTran} = (\text{RsvRecCumlTran} * \text{UncnOld} + \text{RsvRecCumlTran} * (\text{CbRecCumlTran} \div \text{SetBits}(\text{CbRecMask})) * \text{Conflict} + (\text{CbRecCumlTran} \div \text{SetBits}(\text{CbRecMask})) * \text{UncnNew}) \div (\text{UncnOld} + \text{Conflict} + \text{UncnNew}) \qquad \text{EQUATION 11}$$

The new resolved record mask (RsvRecMask) is set to the logical "or" of the combined record's mask (CbRecMask) and the resolved record's current mask.

Finally, at a block 280, the conflict checker 152 sends a signal to the combined record 150 over the line 157 which causes the incoming polygon to be written as the new aggregate combined record.

At a block 270, the process returns to block 262 if there are more polygons to be processed for this pixel. If the last polygon has been processed for this pixel, the pixel shader 36 computes the final shade at a block 282. After all polygons have been processed, any data remaining in combined record 150 is combined into resolved record 151 using the same methods that would be used if another polygon were processed which conflicted with the data in combined record 150. In one embodiment, this is done by setting a "dummy" polygon equal to the current combined record. The dummy polygon is sent to the pixel shader causing the combined record data to be blended with resolved record as desired. The dummy polygon will be cleared when the next pixel shader process commences.

The final pixel shade is equal to the final resolved record value divided by the number of active sub-pixels. Again, using the red color data as an example:

$$\text{FinalRed} = \text{RsvRecRed} \div \text{NoSubPix} \qquad \text{EQUATION 12}$$

Where NoSubPix is the number of active sub-pixels, e.g., 16. The final pixel shade is output over a line 165 and the process terminates at a block 284.

The above algorithms have an important characteristic. Within a tiling of transparent polygons, such as might be used to construct a windshield or aircraft canopy, polygons can't affect each other. That is, the transparency of prior polygons within the tiling won't be applied to subsequent polygons within the tiling. Since their sub-pixel masks are mutually exclusive, they won't inadvertently "double-cover" each other with a double dose of transparency. In addition, by calculating the transparency of a combined record of a tiling of multiple polygons, the correct transparency for that tiling will be applied to subsequent polygons behind the tiling.

To support immediate-mode graphics, the entire process is repeated every time a polygon is rendered, for every pixel the polygon influences. The display video that slowly accumulates during a rendering frame is always available to the video processor.

The procedure set forth above provides an efficient method of blending polygons. In comparison, a rigorously correct approach for blending transparent polygons would require a depth-sort order for every sub-pixel. For example, 16 differently sorted lists would be required for every pixel in a system that uses 16 sub-pixels per pixel. The polygons in each sub-pixel list would be processed in the listed order to develop a final sub-pixel color. Then, all the sub-pixel colors would be added together to generate the final shade for the pixel. This approach is not very cost-effective. In contrast, the disclosed procedure is much simpler yet yields almost identical results.

Once the final pixel shade is computed, it is stored in the frame buffer 26 over a line 96. When an image frame is to be displayed, the final pixel shades are read from the frame buffer 26 and sent to the display device 20 over a line 98. The display device 20 converts the pixel shade data to electrical signals which illuminate the pixels on the display screen.

The display device 20 is implemented using a pixel-based display. Techniques for scanning frame buffers to drive displays pixel-by-pixel are well known in the art. For example, various formats for organizing and scanning frame buffers to drive displays pixel-by-pixel are discussed in the textbook *Computer Graphics: Principles and Practice*, 2nd Edition, Foley, van Dam, Feiner & Hughes, 1991, by Addison-Wesley Publishing Company, at chapters 4 and 18.

There is a critical difference between the above process and conventional multisampler implementations. When the frame buffer is organized as a per-polygon, per-sample structure, a sample can be claimed by only one polygon. In general, order-independent transparency effects can only be achieved with "screen-door" strategies and multiple overlaid transparent polygons cannot be made to combine properly. Also, edges that are behind transparent polygons are rendered with sub-standard image quality. In contrast, by organizing the frame buffer on a per-polygon, per-pixel basis and storing a full set of sub-pixel bits with each polygon, proper composite effects can still be computed even when transparent polygons overlap other polygons in a pixel. The system is no longer limited to just 16 levels of screen-door transparency. Instead, it can have as many as the selected data format for opacity allows. Typically 8 or 12 bits are used. Thus, 256 or 4096 levels would be available. Furthermore, edges behind such transparencies are rendered with full 16-multisample quality.

The images generated by the disclosed embodiment are of very high quality in a number of respects. For example, the quality of edges that are behind transparent polygons is typically as good as the quality of the other edges in the scene. In addition, edges of intersection where polygons pierce one another are typically displayed with relatively high quality. Finally, the occultation solver 32 effectively resolves difficult depth problems even without algorithmic or numerical assists being given to the solver.

The disclosed embodiment generally is implemented using standard computer graphics system components and incorporating some form of graphics pipeline. Typically, this pipeline uses an image generator that consists of a central processor unit and graphics processor, the basic concepts of which are disclosed in the book *Fundamentals of Interactive Computer Graphics,* Foley and Van Dam, 1984, Addison-Wesley Publishing Company, at chapters 4 and 18. Depending on system requirements, the sampling engine 28, occultation solver 32, depth sorter 34 and pixel shader 36 operations described above may be performed on the same processor or different processors.

The details of polygon processing and the corresponding structures used to implement these processes are also well known in the computer graphics art. Several of these techniques and structures are discussed at length in the books *Principles of Interactive Computer Graphics,* 2nd Edition, Newman and Sproull, McGraw-Hill Book Company, 1979, and *Computer Graphics: Principles and Practice,* 2nd Edition, Foley, van Dam, Feiner & Hughes, Addison-Wesley Publishing Company, 1991.

The polygon memory 22, the polygon buffer 30 and the frame buffer 26 typically are implemented using a conventional RAM data memory. Nevertheless, these components may be implemented using any suitable data storage method. In addition, the polygon buffer 30 may be incorporated into the image generator or other processors depending on the selected system design.

Some of the above functions may be implemented using functionally equivalent components including, but not limited to, microprocessors, custom microchips, discrete components and the like. Furthermore, significant portions of the above operations typically would be implemented using computer software programs. The details of these and related implementations are well known in the art of computer systems and computer graphics systems.

Finally, the lines in FIG. 1 (e.g., lines 54 and 96) generally represent the flow of data from one operation to another. Thus, these lines may be implemented using any number of data flow techniques including, but not limited to, data busses that connect the data ports of discrete components or busses that are located inside integrated components. In addition, in integrated computer graphics systems, the flow of data from one component block to another might be implemented using computer program parameter passing operations, interprocess communications or other software techniques.

Figure 9A:
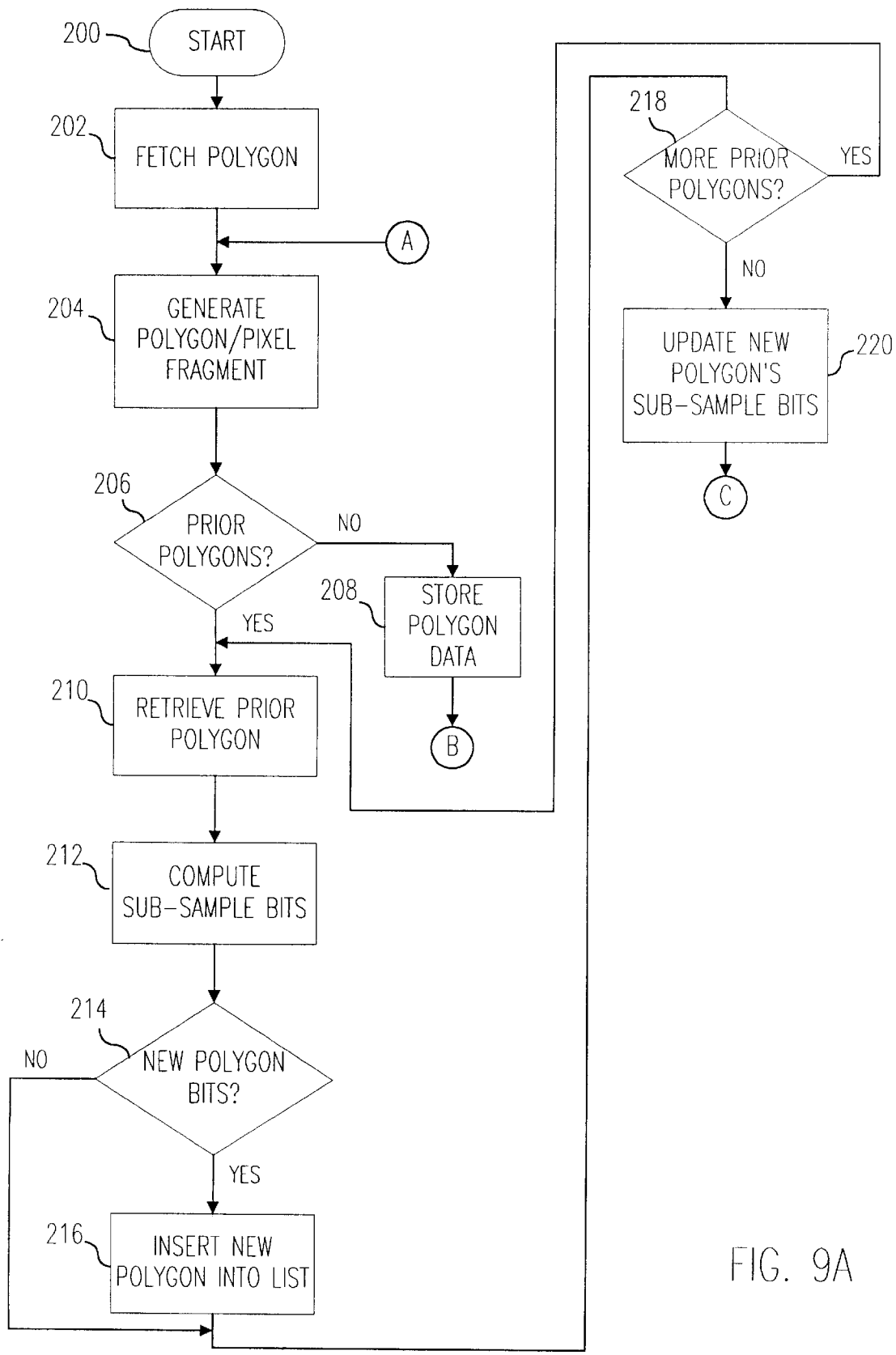
FIGS. 9A and 9B are flowcharts of a pixel shade generating process executed by the system of FIG. 1.
Figure 9B:
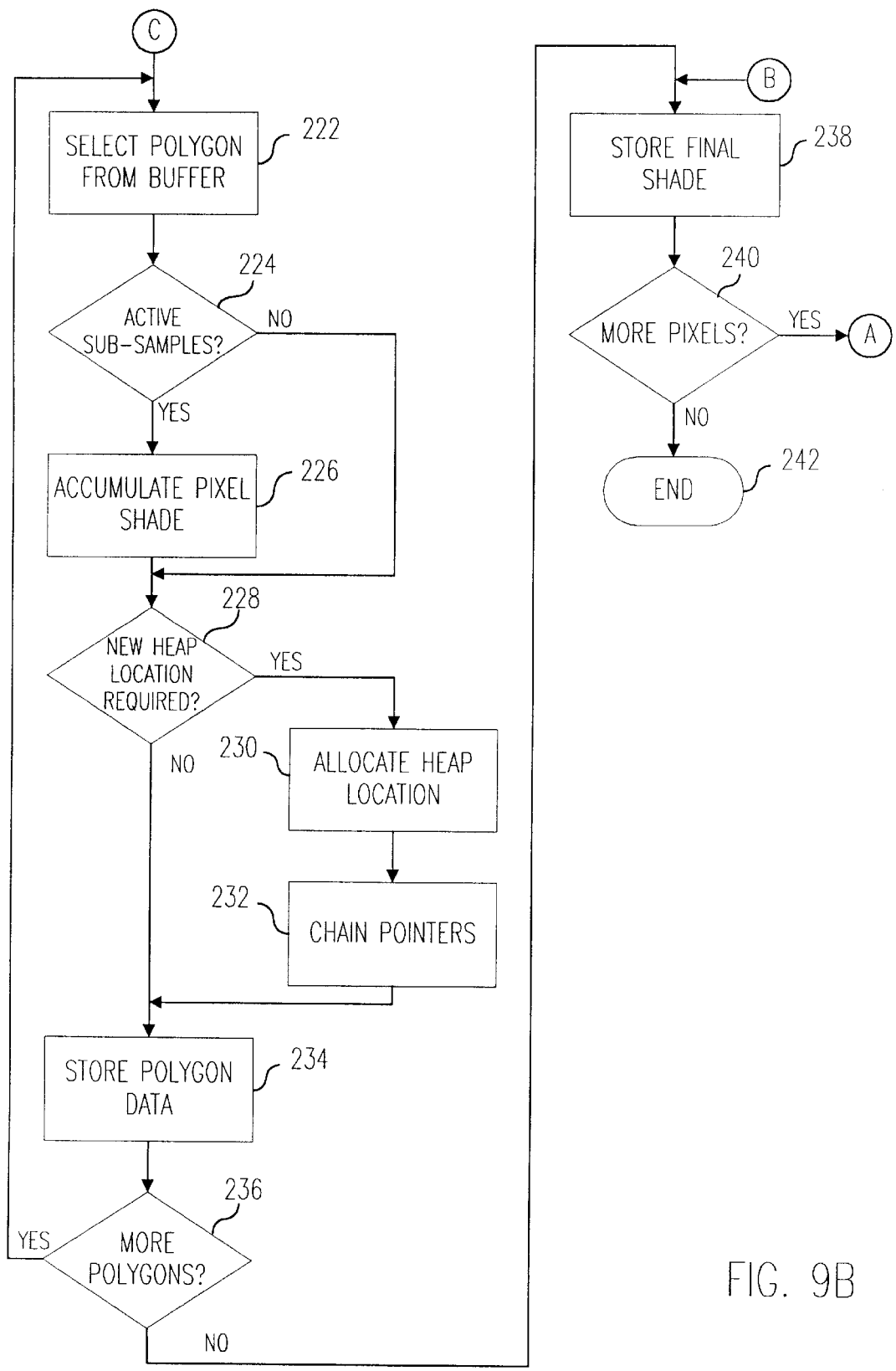

With the structure and function of the components of the present invention in mind, the operation of processing a polygon to generate pixel shade data as performed by the embodiment of FIG. 1 is treated in FIGS. 9A and 9B starting at a block 200 (FIG. 9A, top).

Initially, the sampling engine 28 (FIG. 1) determines which pixel sub-pixels are influenced by the polygon. At a block 202, the sampling engine 28 retrieves a polygon from the polygon memory 22. Then, at a block 204, the sampling engine 28 generates the sub-pixel mask for a pixel influenced by the polygon. A polygon/pixel fragment is output along with the fragment's shading and edge-mask sub-pixel data and the indices of the pixel it is to be combined into.

If no prior polygons have been processed for this pixel (block 206), the new polygon data is stored in the pre-allocated memory location at a block 208 and processing proceeds to the shader stage.

If there are prior polygons, the loop represented by blocks 210 through 218 is executed for each one. At block 210, polygon data for a prior polygon is retrieved from the frame buffer 26 and stored in temporary buffers (e.g., polygon buffer 30) in the multisampler 24.

The occultation solver 32 computes modified sub-pixel bits for the prior and new polygons (block 212). At a block 214, if the new polygon loses all its samples, processing on this polygon/pixel fragment ceases. In this case, no data is changed in the frame buffer 26 and the process proceeds to block 218. Occultation processing may also be skipped if there is no overlap between the new and prior polygons' sub-pixel bits or if both polygons are transparent.

If the new polygon retains at least one sample, the process proceeds to block 216 were the pixel center depth value is used to determine whether the new polygon is closer or farther than the prior polygon. If the new polygon is closer, the new polygon is inserted into the list of prior polygons at this buffer location. All other prior polygons will slide down one slot. If the new polygon is farther, the list remains unchanged. If all prior polygons are in front of the new polygon, it is appended to the end of the temporary buffer list.

At block 218, if there are more prior polygons in the list, the loop returns back to block 210. After all prior polygons have been processed, the remaining sub-pixel bits of the new polygon are updated at its buffer location (block 220).

At this point, all prior polygons have been read from the frame buffer 26 into temporary buffers and the new polygon has been inserted into its proper place in the list. The new polygon's occultation interactions with all prior polygons has been computed and appropriate changes have been made in the sub-pixel mask bits. It should be noted that since buffer allocation is based on pixel center depth, it is possible for more distant polygons to still occult some sub-pixels of the new polygon.

Next, the shader/storage loop represented by blocks 222 through 236 is performed for each polygon in the list. At block 222, a polygon is selected from the list.

At a block 224, if a polygon buffer entry no longer has active sub-pixels, the process proceeds to a block 228. If the polygon buffer entry does have active sub-pixels, its effect is added to the accumulating pixel shade based on its color, opacity, number of sub-pixel bits, and the transparency of any prior polygons that overlap any sub-pixels with it (block 226).

Next, the polygon buffer data is stored in the frame buffer 26. At a block 228, if a new heap location is required it is allocated (block 230) and the appropriate heap pointers are properly chained (block 232). At a block 234, the polygons are read from the temporary buffers and written to the frame buffer 26. Polygons whose sub-pixel bits were all cleared by the occultation solver 32 are not used, nor are they stored back in the frame buffer 26.

At a block 236, if more polygons in the list need to be processed, the process return back to block 222. At the end of the shader loop, the computed shade is stored in the pixel video location (block 238).

At a block 240, if any more pixels that are influenced by the new polygon need to be processed, the process returns to block 204 where the above steps are performed for the next pixel. Otherwise the process terminates at a block 242.

From the above, it is apparent that the system disclosed herein utilizing adaptive pixel multisampling offers an improved system for generating pixel data. Recognizing that the system can be implemented with standard graphics and display components, it should be noted that considerable variation may occur in the specific components and operating format. The scope of the present invention should be determined with a reference to the claims set forth below.

What is claimed is:

1. A computer graphics system for generating pixel data to display images on a display device utilizing an array of pixels, comprising:
    a data memory for storing primitives representative of said images;
    a frame buffer for storing said pixel data including, means for storing a plurality of primitive fragments for a pixel wherein each of said fragments is associated with a distinct primitive; and
    a processor for processing said primitives to generate said primitive fragments wherein said processor stores a plurality of said primitive fragments for a pixel in said frame buffer, said processor for processing said primitive fragments to generate composite pixel data to display images on said display device.

2. The computer graphics system of claim 1 further including a depth sorter for depth ordering said primitive fragments for a pixel.

3. The computer graphics system of claim 2 wherein said depth sorter orders said primitive fragments using pixel-center depth values.

4. The computer graphics system of claim 1 further including a pixel shader for combining said primitive fragments according to sub-pixel use by a current polygon and at least one prior polygon.

5. The computer graphics system of claim 4 further including an occultation solver wherein said primitive fragments include sub-pixel information and said occultation solver modifies said sub-pixel information to eliminate hidden primitives.

6. The computer graphics system of claim 1 further including a sampling engine for generating sub-pixels using non-contiguous sub-pixel areas.

7. The computer graphics system of claim 6 wherein said sub-pixel areas interlock so that every portion of an image plane defined by said pixels is associated with only one of said pixels.

8. The computer graphics system of claim 1 wherein at least a portion of said frame buffer is managed as a heap.

9. The computer graphics system of claim 1 further including a display device containing an array of pixels for displaying said images.

10. The computer graphics system of claim 1 further including a pixel shader for combining said primitive fragments wherein said pixel shader includes a cumulative transparency generator for calculating a cumulative transparency for a tiling of polygons in a combined record.

11. The computer graphics system of claim 10 further including a resolved record for storing cumulative combined record data.

12. A computer graphics process for generating pixel data to display images on a display device containing an array of pixels, comprising the steps of:
    storing primitives representative of said images;
    processing said primitives to generate a plurality of primitive fragments for a pixel wherein each of said fragments is associated with a distinct primitive;
    storing said plurality of primitive fragments for a pixel in a memory; and
    processing said primitive fragments to generate composite pixel data to display images on said display device.

13. The computer graphics process of claim 12 further including the step of depth ordering said primitive fragments for a pixel.

14. The computer graphics process of claim 13 wherein said depth ordering includes the step of ordering said primitive fragments using a pixel-center depth value.

15. The computer graphics process of claim 12 further including the step of processing said primitive fragments according to sub-pixel use by a current polygon and at least one prior polygon.

16. The computer graphics process of claim 12 further including the step of processing said primitive fragments by generating a cumulative transparency for a tiling of said primitives in a combined record.

17. The computer graphics process of claim 16 further including the step of generating a resolved record from cumulative combined record data.

18. The computer graphics process of claim 12 further including the step of generating sub-pixels using non-contiguous sub-pixel areas.

19. The computer graphics process of claim 18 wherein said sub-pixel areas interlock so that every portion of an image plane defined by said pixels is associated with only one of said pixels.

20. The computer graphics process of claim 12 further including the step of managing at least a portion of said memory as a heap.

* * * * *